US 9,378,733 B1

(12) United States Patent
Vanhoucke et al.

(10) Patent No.: US 9,378,733 B1
(45) Date of Patent: Jun. 28, 2016

(54) KEYWORD DETECTION WITHOUT DECODING

(71) Applicant: Google Inc., Mountain View, CA (US)

(72) Inventors: Vincent O. Vanhoucke, San Francisco, CA (US); Oriol Vinyals, Berkeley, CA (US); Patrick An Phu Nguyen, Palo Alto, CA (US); Maria Carolina Parada San Martin, Palo Alto, CA (US); Johan Schalkwyk, Scarsdale, NY (US)

(73) Assignee: Google Inc., Mountain View, CA (US)

( * ) Notice: Subject to any disclaimer, the term of this patent is extended or adjusted under 35 U.S.C. 154(b) by 558 days.

(21) Appl. No.: 13/860,982

(22) Filed: Apr. 11, 2013

Related U.S. Application Data

(60) Provisional application No. 61/786,251, filed on Mar. 14, 2013, provisional application No. 61/739,206, filed on Dec. 19, 2012, provisional application No. 61/788,749, filed on Mar. 15, 2013.

(51) Int. Cl.
| | |
|---|---|
| *G10L 17/24* | (2013.01) |
| *G06F 21/46* | (2013.01) |
| *G10L 15/08* | (2006.01) |
| *G10L 15/22* | (2006.01) |
| *G10L 25/51* | (2013.01) |

(52) U.S. Cl.
CPC ........................... *G10L 15/08* (2013.01)

(58) Field of Classification Search
CPC ......... G10L 17/24; G10L 15/08; G10L 15/22; G10L 25/51; G06F 21/46
USPC .................. 704/1–9, 251, 253, 254
See application file for complete search history.

(56) References Cited

U.S. PATENT DOCUMENTS

| | | | | |
|---|---|---|---|---|
| 7,212,968 | B1* | 5/2007 | Garner | G06F 17/3043 704/231 |
| 7,337,116 | B2* | 2/2008 | Charlesworth | G10L 15/06 704/241 |
| 2004/0210437 | A1* | 10/2004 | Baker | G10L 15/08 704/251 |
| 2010/0223057 | A1* | 9/2010 | Capman | G10L 17/02 704/250 |
| 2012/0155663 | A1* | 6/2012 | Weinberg | H04M 3/2281 381/59 |
| 2012/0245934 | A1* | 9/2012 | Talwar | G10L 15/22 704/235 |

OTHER PUBLICATIONS

Hinton et al., Deep Neural networks for Acoustic Modeling in speech recognition, IEEE Signal Processing magazine, Nov. 2012, pp. 82-97.*
Yasser et al.,"Confidence Measure Improvement Using Useful Predictor Features and Support Vector Machines", May 2012, ICEE, 2012 20th conference on, IEEE, pp. 1168-1171.*
Brindle, J.S., "An Efficient Elastic-Template Method for Detecting Given Words in Running Speech," British Acoustical Society, Spring Meeting, Apr. 1973, 5 pages.
(Continued)

*Primary Examiner* — Pierre-Louis Desir
*Assistant Examiner* — Seong Ah A Shin
(74) *Attorney, Agent, or Firm* — Fish & Richardson P.C.

(57) ABSTRACT

Embodiments pertain to automatic speech recognition in mobile devices to establish the presence of a keyword. An audio waveform is received at a mobile device. Front-end feature extraction is performed on the audio waveform, followed by acoustic modeling, high level feature extraction, and output classification to detect the keyword. Acoustic modeling may use a neural network or a vector quantization dictionary and high level feature extraction may use pooling.

21 Claims, 9 Drawing Sheets

(56) References Cited

OTHER PUBLICATIONS

Shekofteh et al., "Confidence Measure Improvement Using Useful Predictor Features and Support Vector Machines," May 2012, ICEE, 2012 20th conference on, IEEE, pp. 1168-1171.
Office Action issued in U.S. Appl. No. 13/861,020 on May 8, 2015, 15 pages.
"Embedded Speech Technologies for Consumer Electronics," Sensory, Inc., downloaded from the internet on Sep. 12, 2012, http://www.sensoryinc.com/, 2 pages.
Benayed, Y. et al., "Confidence Measures for Keyword Spotting Using Support Vector Machines," IEEE International Conference on Acoustics, Speech, and Signal Processing, Apr. 2003, 4 pages.
Grangier, David et al., "Discriminative Keyword Spotting", Automatic Speech and Speaker Recognition: Large Margin and Kernel Methods, Wiley, 2009, 23 pages.
Higgens, Alan et al., "Keyword Recognition Using Template Concatenation," IEEE International Conference on Acoustics, Speech, and Signal Processing, Apr. 1985, ICASSP-85, 4 pages.
Keshet, Joseph et al., "Discriminative Keyword Spotting," Speech Communication, vol. 51, No. 4, Apr. 30, 2009, 27 pages.
Rose, Richard C. et al., "A Hidden Markov Model Based Keyword Recognition System," IEEE International Conference on Acoustics, Speech, and Signal Processing, Apr. 1990, ICASSP-90, 4 pages.
Sandness, Eric D. et al., "Keyword-Based Discriminative Training of Acoustic Models," 6th International Conference on Spoken Language Processing, ICSLP 2000/INTERSPEECH 2000, Oct. 2000, 4 pages.
Weintraub, Mitchel et al., "Neural-Network Based Measures of Confidence for Word Recognition," IEEE International Conference on Acoustics, Speech, and Signal Processing, 1997, ICASSP-97, Apr. 1997, 4 pages.

* cited by examiner

KEYWORD DETECTION WITHOUT DECODING

CROSS-REFERENCE TO RELATED APPLICATIONS

This application claims the benefit of U.S. Provisional Application No. 61/788,749 filed Mar. 15, 2013, U.S. Provisional Application No. 61/786,251, filed Mar. 14, 2013 and U.S. Provisional Application No. 61/739,206, filed Dec. 19, 2012, which are incorporated herein by reference.

FIELD

This specification describes technologies related to voice recognition.

BACKGROUND

Automatic speech recognition is an important technology that is used in mobile devices. One task that is a common goal for this technology is to be able to use voice commands to wake up and have basic spoken interactions with the device. For example, it may be desirable to recognize a "hotword" that signals that the mobile device should activate when the mobile device is in a sleep state.

SUMMARY

The methods and systems described herein provide keyword recognition that is fast and low latency, power efficient, flexible, and optionally speaker adaptive. A designer or user can choose the keywords, and other speakers cannot activate the device. Embodiments include various systems directed towards robust and efficient keyword detection.

In general, one innovative aspect of the subject matter described in this specification can be embodied in a process that is performed by a data processing apparatus. The process includes receiving a plurality of audio frame vectors that each model an audio waveform during a different period of time, selecting a non-empty subset of the audio frame vectors, obtaining a corresponding non-empty subset of acoustic event vectors that results from coding the subset of the audio frame vectors, selecting a non-empty subset of the acoustic event vectors to generate a pooled event vector; and inputting the pooled event vector into a keyword classifier.

Another innovative aspect of the subject matter described in this specification can be embodied in another process that is performed by a data processing apparatus. The process includes receiving a plurality of audio frame vectors that each model an audio waveform during a different period of time, selecting at least first and second subsets of the audio frame vectors, obtaining at least first and second acoustic event vectors that result from coding the at least first and second subsets of the audio frame vectors, respectively, selecting the at least first and second acoustic event vectors, generating a pooled event vector based on pooling the selected event vectors, and inputting the pooled event vector into a keyword classifier.

Other embodiments of these aspects include corresponding system, apparatus, and computer programs, configured to perform the actions of the method, encoded on computer storage devices.

These and other embodiments may each optionally include one or more of the following features. For instance, the process may include determining, using the keyword classifier, that a keyword was present in the audio waveform during the period of time modeled by the audio frame vectors. The process may also include producing a plurality of audio frame vectors by performing front-end feature extraction on an acoustic signal. Embodiments may include embodiments in which the audio frame vectors are coded using a neural network, in which the audio frame vectors are coded using a restricted Boltzmann machine, and in which the audio frame vectors are coded using a vector quantization dictionary. Also embodiments may operate so that the pooling uses root mean square (RMS) pooling, max-pooling, mean-pooling, or a recurrent neural network.

Particular embodiments of the subject matter described in this specification can be implemented so as to realize one or more of the following advantages. Embodiments provide a way to recognize whether or not a keyword was uttered in a way that provides a simple design that can obtain good results while minimizing the need for processing and power resources.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
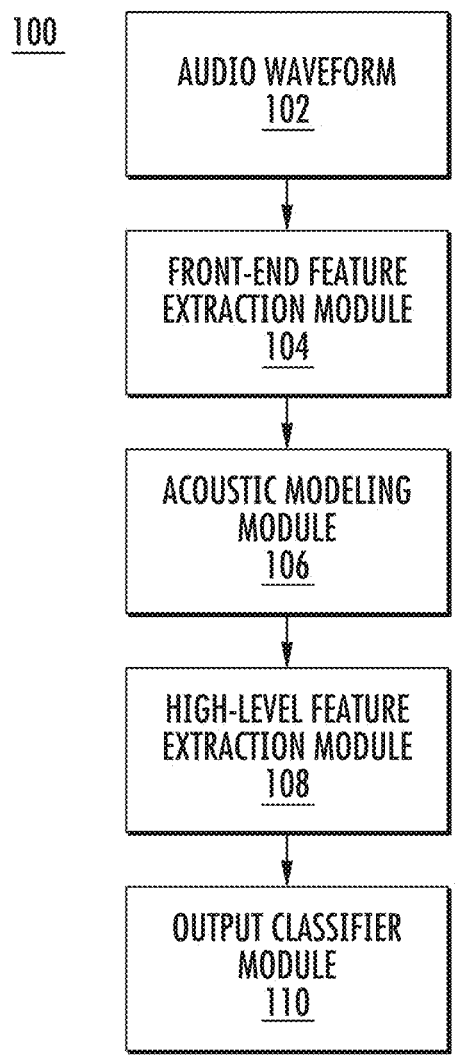
FIG. 1 is a block diagram 100 that illustrates dataflow in an embodiment.

When using a mobile device, it is desirable to provide a way of turning the device on or performing another action based on the utterance of a keyword. For example, if a user says "Google," it may cause a smartphone to activate. However, it requires power to constantly monitor and process the audio received by the mobile device, and hence it is important to provide an approach for recognizing whether or not the keyword has been uttered while minimizing the power consumption needed to "listen" for the keyword.

Embodiments may listen for keywords while minimizing resource usage through a variety of approaches. One embodiment, to be referred to as "SparseHotword," does not require any additional information besides training data for a specific word. Another embodiment, referred to as "DeepHotword," is based on an acoustic model trained on a large corpus.

SparseHotword and DeepHotword are both designed to provide a decoder-free system, that requires only acoustic models to achieve detection of a keyword. The present specification further address two different scenarios, one for offline detection, that is, based on analysis of an entire given utterance subsequent to receiving the utterance, is the target word present or not?, and one for online detection, where a decision is made at each time step. Initial experiments show that the performance achieved by both systems is either equal or better than a system based on fully decoding the utterance, while being more computationally efficient.

While some implementations discussed elsewhere in this specification discuss an implementation that detects a single keyword, implementations are not necessarily limited to detecting one keyword. In fact, some implementations may be used to detect a plurality of keywords. The keywords in these implementations may also be short phrases. Such implementations allow a user to select one of a certain number of actions, such as actions presented in a menu, by saying one of the menu entries. For example, implementations may use different keywords to trigger different actions such as taking a photo, sending an email, recording a note, and so on. Given a finite number of words and/or phrases to be detected, which will ordinarily not exceed 20 or so, this technology may be used. However, other implementations may be adapted to handle more words and/or phrases if required.

At a high level, one system embodiment comprises four modules. Module 1 is a front-end feature extraction module, which performs: a) speech activity detection; b) windowing of the acoustic signal; c) short-term Fourier transform; d) spectral subtraction, optionally; e) filter bank extraction; and f) log-energy transform of the filtered output. Module 2 is an acoustic model, which can be one of: a) a neural network, possibly truncated of its last layers; b) a vector quantization dictionary; or c) a restricted Boltzmann machine. In module 2, the input features are converted into acoustic events by either forward-propagation through the neural network (NN) or restricted Boltzmann machine (RBM), or in the case of the vector quantization dictionary using sparse coding. Module 3 is a high level feature extraction module based on pooling (pooling layer). Module 3 aggregates the acoustic events detected over a window of time. The pooling can be one of: a) root-mean-square (RMS)-pooling, which takes the square root of the sum of squares of each acoustic event; b) max-pooling, which takes the maximum; c) mean-pooling, which takes an average over the window; or d) a recurrent neural network which maps the inputs to the output vector in a trainable way. Module 4 is an output classifier, which takes as an input the output feature vector from module 3 and possibly some side information to yield a binary decision about the presence of the keyword. The output classifier can be for example: a) a support vector machine or b) a logistic regression.

Various embodiments will now be discussed in connection with the drawings to explain their operation.

FIG. 1 is a block diagram 100 that illustrates dataflow in an embodiment. The data flow begins with an audio waveform 102. Audio waveform 102 represents audio received by an embodiment. For example, audio waveform 102 may be an analog or digital representation of sound in the environment of an embodiment that is captured by a microphone. Once audio waveform 102 is introduced into the embodiment, it is sent to front-end feature extraction module 104. Front-end feature extraction module 104 performs a series of stages, detailed in FIG. 2, that take audio waveform 102 and transform it into a series of vectors for further processing. Once front-end feature extraction module 104 has done the processing of audio waveform 102, its output is sent to acoustic modeling module 106. Acoustic modeling module 106 may use a variety of techniques, detailed in FIG. 3, to perform coding on the inputs to produce acoustic event vectors that are representative of features of audio waveform 102 over a period of time. The acoustic event vectors from acoustic modeling module are sent to a high-level feature extraction module 108 that pools the acoustic event vectors, as detailed in FIG. 4, to future analyze characteristics of audio waveform 102 over a time interval to provide information that can be used to detect if the keyword was uttered. After the acoustic event vectors are pooled, the pooled output is sent to output classifier module 110 to make a determination about whether the keyword is present, as is discussed in FIG. 5.

Various system embodiments are similar in their overall structure. They include modules that use similar architectures to accomplish similar goals: 1) front-end feature extraction, 2) acoustic model, 3) higher level feature extraction module, and a 4) classifier module. However, there are several embodiments that differ in certain respects.

Embodiments approach the problem of keyword detection in advantageous ways. The system embodiments discussed above both have only a few parameters to adapt, to allow the operation of the high level feature extraction module. For example, one embodiment can have a simple low power implementation in hardware (ASIC or FPGA). Another embodiment has the advantage that it only extracts features when a first level alignment is found, reducing high level feature computation. The approaches used in these systems are advantageous because they only involve adaptation of a few parameters to adapt to change the keywords matched or to adapt to a given speaker's voice.

Figure 2:
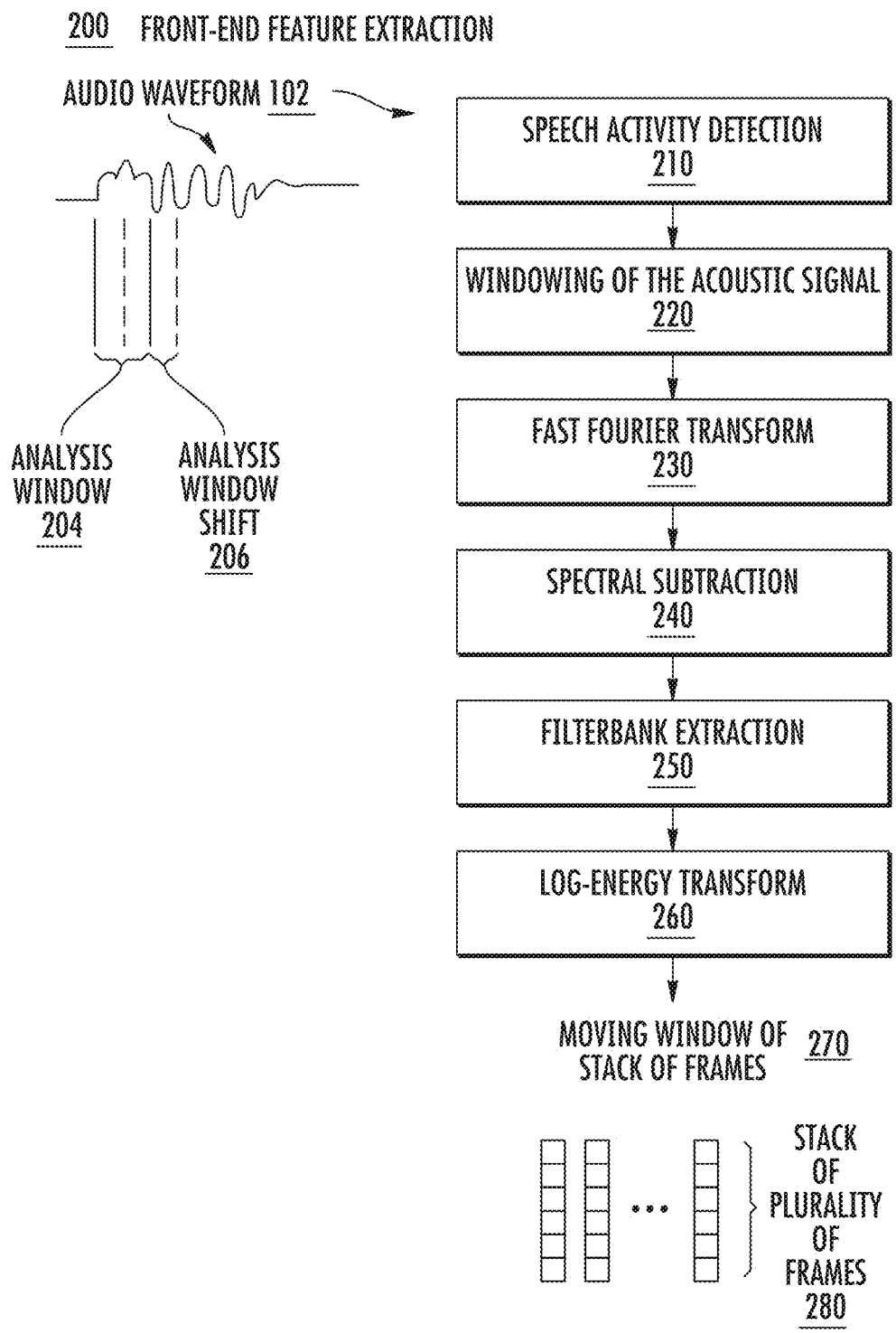
FIG. 2 is a block diagram 200 that illustrates dataflow in a front-end feature extraction process.

FIG. 2 is a block diagram 200 that illustrates dataflow in a front-end feature extraction process. Audio waveform 102, as illustrated in FIG. 2, includes analog and/or digital information about incoming sound that an embodiment can analyze to detect the presence of a keyword. One way to capture audio waveform 102 for analysis is to divide it up into a plurality of analysis windows. For example, FIG. 2 shows an analysis window 204 that uses a vector to represent audio waveform 102 over a time period that is chosen as the size of analysis window 204, for example a 25 ms time period. Multiple analysis windows are obtained in succession by performing an analysis window shift 206, for example a 10 ms time period. Analysis windows may be chosen to overlap. For example, one analysis window may represent audio waveform 102 from a start time of 0 ms to an end time of 25 ms, and a subsequent analysis window may represent audio waveform 102 from a start time of 10 ms to an end time of 35 ms.

The analysis windows 204 are obtained as part of speech activity detection 210, in which an embodiment obtains information about available sound in its environment. Speech activity detection 210 may be designed to occur regardless of whether there is sound in the surroundings of an embodiment, or it may, for example, occur only when a volume of sound greater than a threshold volume is received. Once speech activity detection 210 occurs, it is followed by windowing of the acoustic signal 220. As discussed, each window should be a fairly short time interval, such as 25 ms, that represents characteristics of audio waveform 102 over that time interval. After windowing, embodiments may perform a fast Fourier transform 230 on the windowed data so as to analyze the constituent frequencies present in the audio waveform. Additionally, embodiments may optionally perform spectral subtraction 240 to minimize the effects of noise on the information provided by the other steps. Next, filter bank extraction 250 can allow the decomposition of the information from the previous steps by using filters to separate individual components of the audio data from one another. Finally, performance of a log-energy transform 260 can help normalize the data in order to make it more meaningful.

The result of the processing performed in FIG. 2 is a moving window of a stack of frames 270. For example, stack of frames 270 may include 11 frames, each including information about 25 ms of audio waveform 102, with a shift of 10 ms between frames. However, it is not necessary to use a stack of 11 frames, and stack of frames 270 may include as few as 2 frames or any larger number of frames. The end output of front-end feature extraction 200 is thus a stack of a plurality of frames 280 that represents features of audio waveform 102 by performing the aforementioned analytical techniques to obtain information about characteristics of the audio waveform 102 for successive time intervals.

Figure 3:
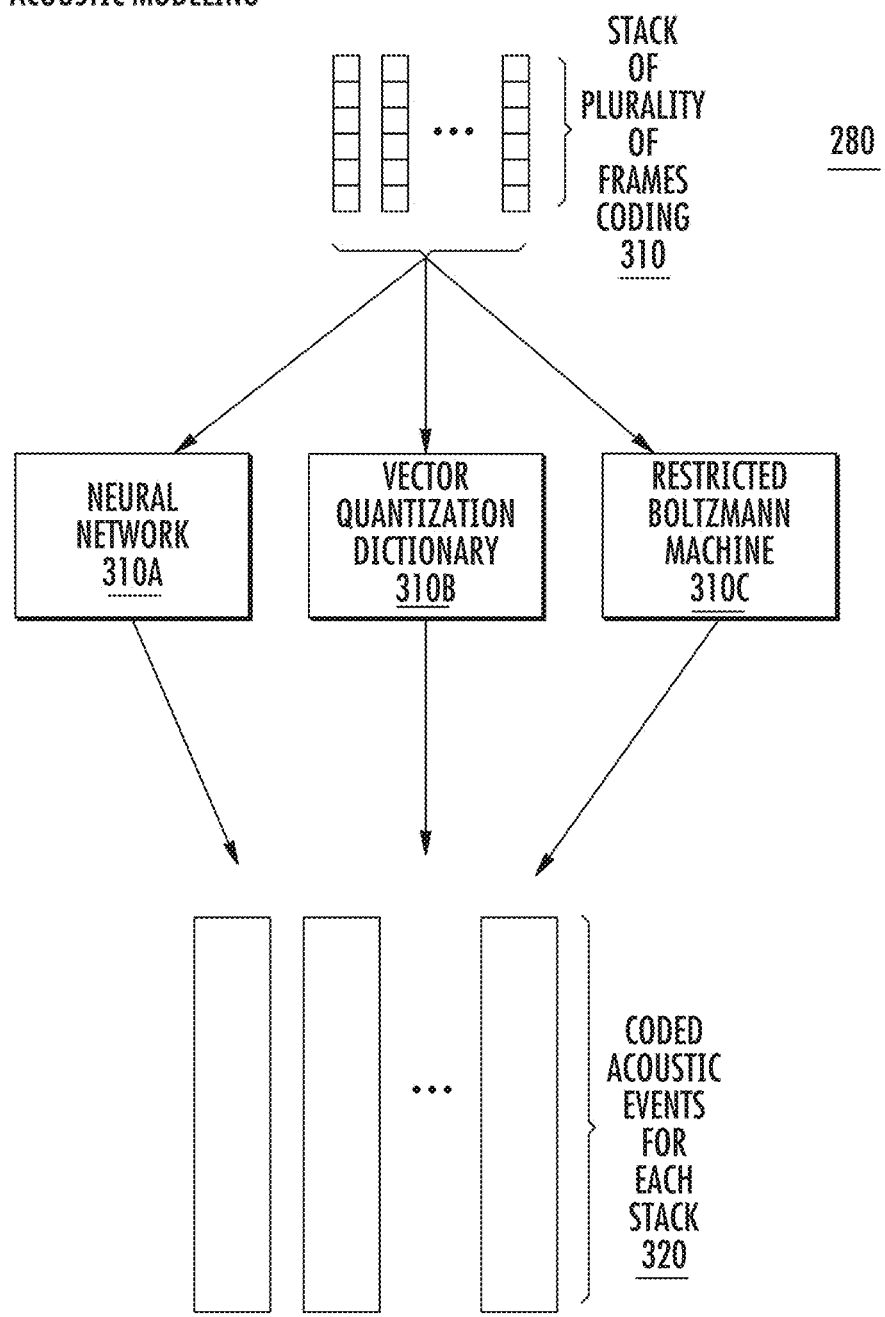
FIG. 3 is a block diagram 300 that illustrates dataflow in an acoustic modeling process.

FIG. 3 is a block diagram 300 that illustrates dataflow in an acoustic modeling process. FIG. 3 begins with stack of the plurality of frames 280 produced by the process depicted in FIG. 2. FIG. 3 includes coding 310 of the plurality of frames to produce coded acoustic events for each stack 320. For example, 3 ways in which this process may occur are included in FIG. 3, including a neural network 310A, a vector quantization dictionary 310B, or a restricted Boltzmann machine 310C. It may be noted that a restricted Boltzmann machine 310C is a specific type of neural network 310A that is well-adapted to this application. The goal of this coding is to produce coded acoustic events 320 that are single vectors that represent pluralities of initial vectors in the stack of plurality of frame 280 as single vectors with salient information about features of the audio waveform 102 over the interval that they model. For example, the input features may be converted into acoustic events by either forward-propagation through the neural network 310A or restricted Boltzmann machine 310C, or in the case of vector quantization dictionary 310B it may use the approach of sparse coding.

Figure 4:
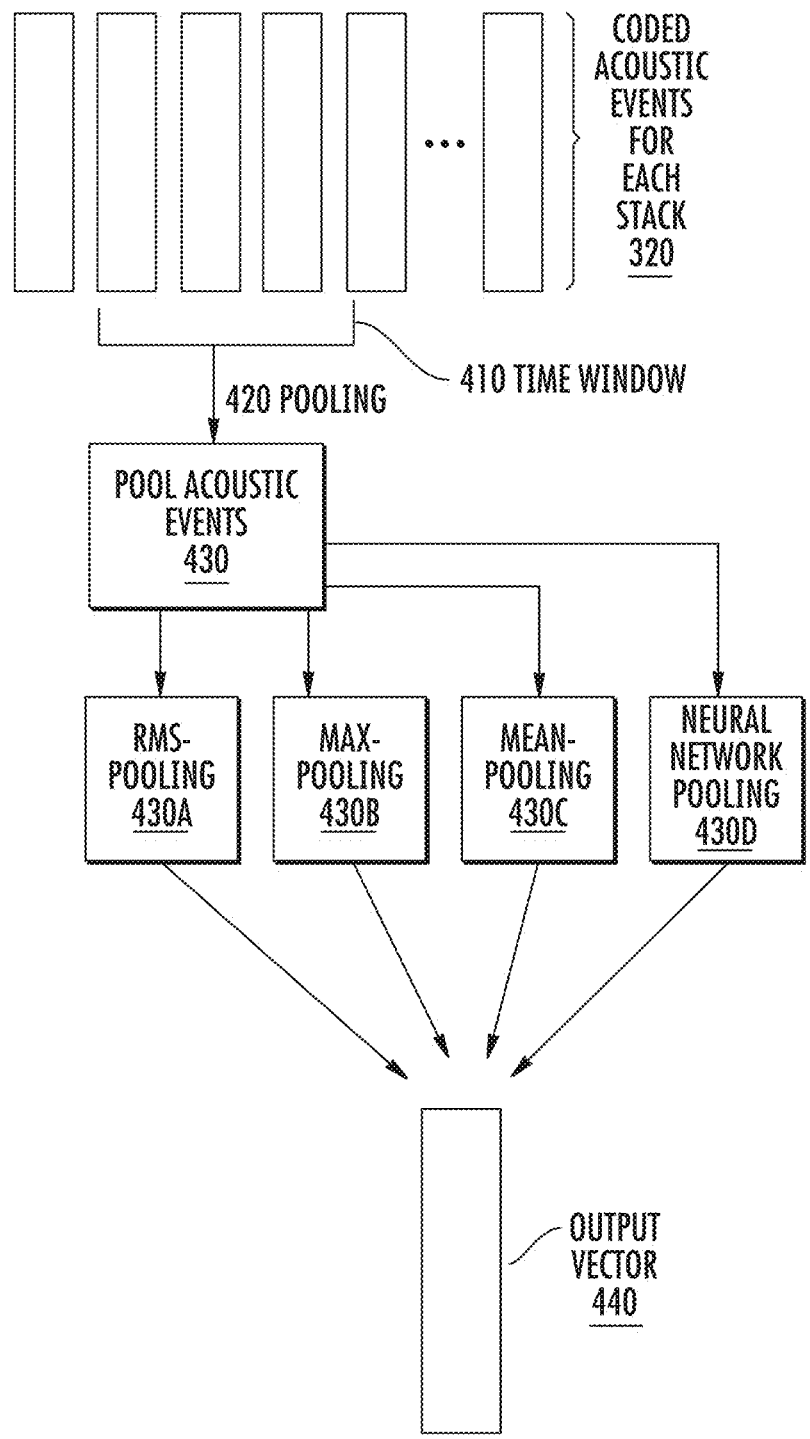
FIG. 4 is a block diagram 400 that illustrates dataflow in a high-level feature extraction process.

FIG. 4 is a block diagram 400 that illustrates dataflow in a high-level feature extraction process. FIG. 4 begins with coded acoustic events for each stack 320, as produced in FIG. 3. The high-level feature extraction process begins with time window 410, the time window containing a plurality of coded acoustic events. Pooling 420 occurs, such that there is a stage in which the high-level features extraction pools acoustic events 430. Pooling 420 may occur in a variety of ways that merges information contained in coded acoustic events for each stack 320. For example, pooling 420 may use root-mean-square (RMS) pooling 430A, which takes the square root of the sum of the squares of each acoustic event. Max-pooling 430B takes the maximum. Mean-pooling 430C takes an average over the window. A recurrent neural network 430D maps inputs to an output vector in a trainable way. The result of pooling 420, which may also include other pooling techniques not listed herein, is an output vector 440 which includes information about the audio waveform 102 that has been distilled and processed so it is easy to draw conclusions about the presence of the keyword in audio waveform 102 over time window 410 that pooling 420 represents.

Figure 5:
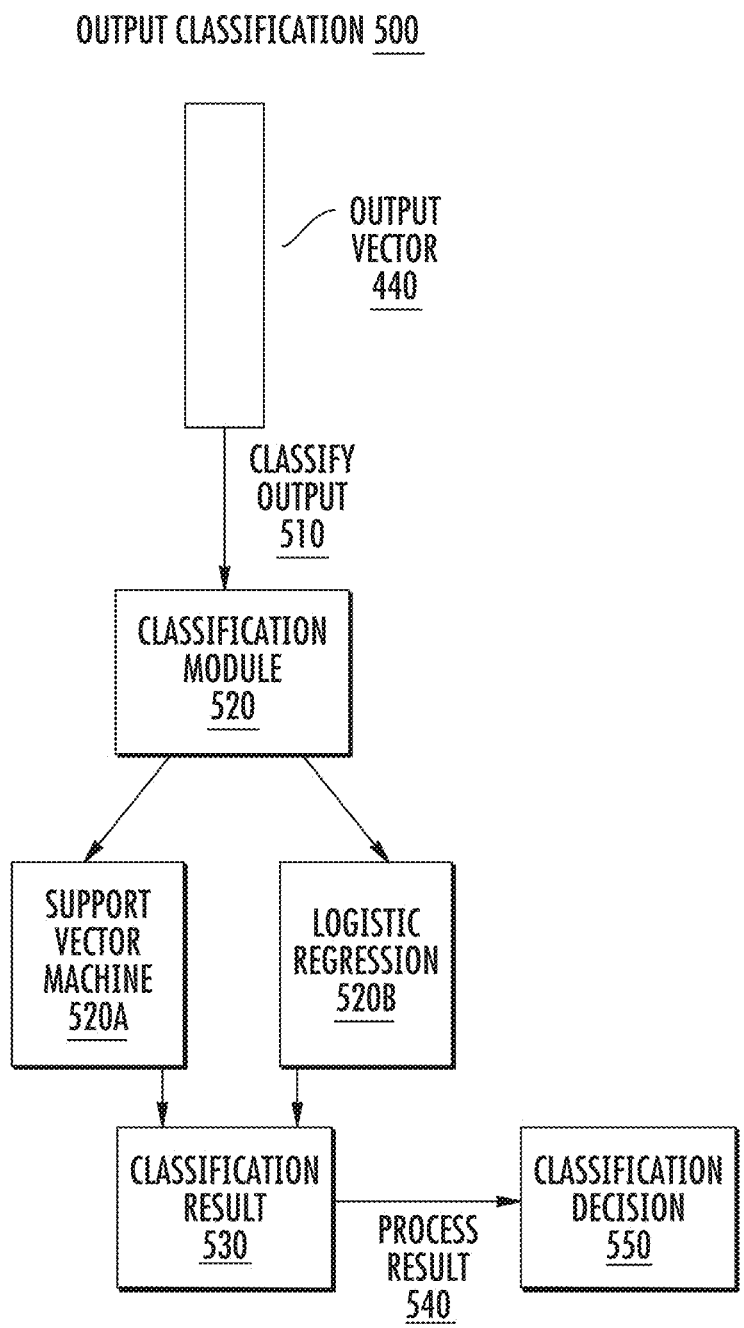
FIG. 5 is a block diagram 500 that illustrates dataflow in an output classification process.

FIG. 5 is a block diagram 500 that illustrates dataflow in an output classification process. FIG. 5 begins with output vector 440 that has been produced by FIG. 4. Based on output vector 440, FIG. 5 takes a step to classify output 510 using classification module 520. For example, classification module 520 may use support vector machine 520A or logistic regression 520B. The goal of classification module 520 is to make a binary decision about whether the keyword was uttered during time window 410 associated with output vector 440. Classification module 520 produces classification result 530.

This may be an actual classification decision 550, in terms of a Boolean decision confirming that the keyword was present or not. Alternatively, classification result may also be a score, for example one that represents the likelihood that the keyword is present. If classification result 530 is a score, there may be a step to process the result 540 to yield classification decision 550, for example comparing the score to a threshold value.

Figure 6:
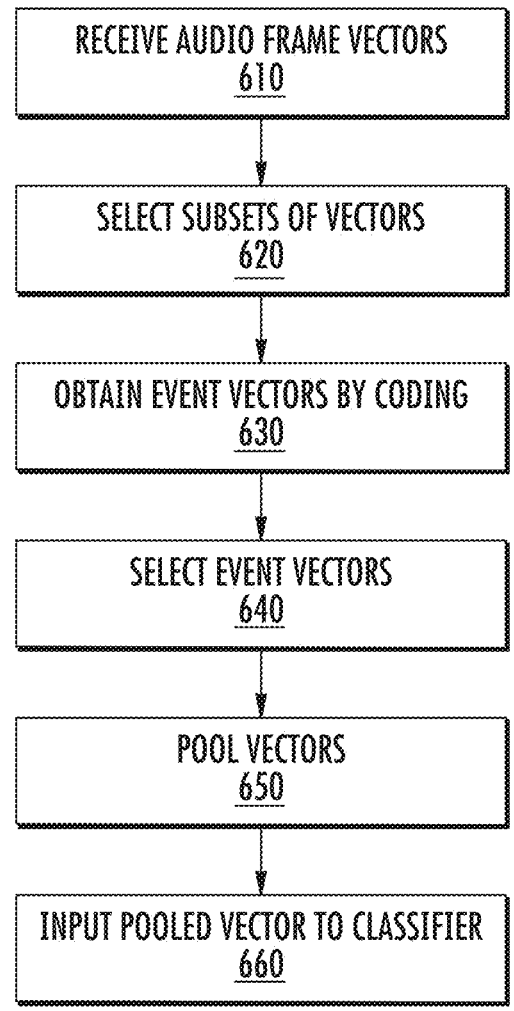
FIG. 6 is a flowchart 600 of the stages involved in an example process for detecting keyword utterances in an audio waveform.

FIG. 6 is a flowchart 600 of the stages involved in an example process for detecting keyword utterances in an audio waveform.

In stage 610, audio frame vectors are received. For example, stage 610 may be performed as in FIG. 2, such that front-end feature extraction module 104 processes audio waveform 102 to yield the vectors, which are represented in FIG. 2 as stack of the plurality of frames 280.

In stage 620 subsets of vectors are selected. For example stage 620 may be performed as in FIG. 2, such that the processing of audio waveform 102 yields a stack of the plurality of frames 280 that constitutes the subset of vectors.

In stage 630, event vectors are obtained by coding. For example, this step is performed by acoustic modeling module 106 as in FIG. 3.

In stage 640, event vectors are selected. For example, this step is performed when coded acoustic events for each stack 320 are selected by high-level feature extraction module 108 as in FIG. 4.

In stage 650, the vectors are pooled. For example, this step may occur as pooling 420 as in FIG. 4 by high-level feature extraction module 108.

In stage 660, the pooled vector is input to the classifier. For example, high-level feature extraction module 108 sends its output, output vector 440 to output classifier module 110 to make this determination as in FIG. 5.

Figure 7:
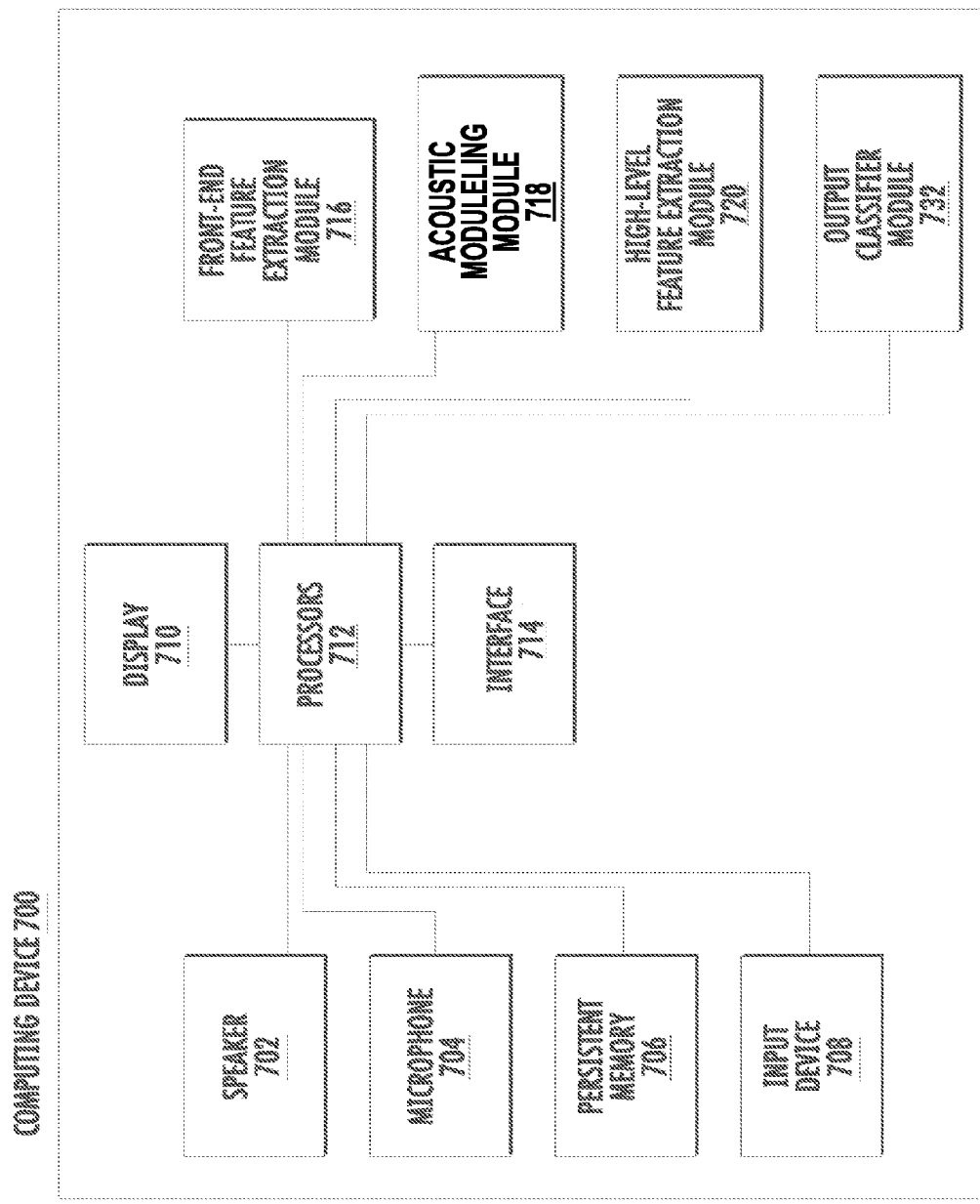
FIG. 7 is a block diagram 700 of an example system that can detect keyword utterances in an audio waveform.

FIG. 7 is a block diagram 700 of an example system that can detect keyword utterances in an audio waveform. The system contains a variety of constituent parts and modules that may be implemented through appropriate combinations of hardware, firmware, and software that allow computing device 700 to function as an embodiment of appropriate features.

Computing device 700 contains one or more processors 712 that may include various hardware devices designed to process data. Processors 712 are communicatively coupled to other parts of computing device 700. For example, processors 712 may be coupled to a speaker 702 and a microphone 704 that allow output and input of audio signals to and from the surroundings of computing device 700. Microphone 704 is of special import to the functioning of computing device 700 in that microphone 704 provides the raw signals that capture aspects of audio waveform 102 that are processed in other portions of computing device 700. Additionally, computing device 700 may include persistent memory 706. Persistent memory may include a variety of memory storage devices that allow permanent retention and storage of information manipulated by processors 712. Furthermore, input device 708 allows the receipt of commands from a user, and interface 714 allows computing device 700 to interact with other devices to allow information exchange. Additionally, processors 712 may be communicatively coupled to a display 710 that provides a graphical representation of information processed by computing device 700 for the user to view.

Additionally, processors 712 may be communicatively coupled to a series of modules that perform the functionalities necessary to implement the method of embodiments that is presented in FIG. 6. These modules include front-end feature extraction module 716, which performs as illustrated in FIG.

2, acoustic modeling module 718, which performs as illustrated in FIG. 3, high-level feature extraction module 720, which performs as illustrated in FIG. 4, and output classifier module 722, which performs as illustrated in FIG. 5.

Further Discussion: SparseHotword and DeepHotword

As discussed above, the task of hotword or keyword detection is an important component in many speech recognition applications. For example, when the vocabulary size is limited, or when the task requires activating a device, for example, a phone, by saying a word, keyword detection is applied to classify whether an utterance contains a word or not.

For example, the task performed by some embodiments includes detecting a single word, for example, "Google," that will activate a device in standby to perform a task. This device, thus, should be listening all the time for such word. A common problem in portable devices is battery life, and limited computation capabilities. Because of this, it is important to design a keyword detection system that is both accurate and computationally efficient.

In addition to general aspects of embodiments, discussed above, embodiments also include two approaches to accomplish keyword detection, SparseHotword and DeepHotword. None of these approaches require decoding, which is often regarded as the most computationally expensive part in typical keyword systems.

SparseHotword does not use any additional data, and consists of an unsupervised phase—one in which models are learned with no need of labels—followed by a supervised model for classification based on features extracted with the unsupervised model. DeepHotword uses an acoustic model trained with a separate set of data to explore transfer learning from a domain that is related. However, instead of decoding using the acoustic model, DeepHotword just extracts features from the acoustic model and, as in SparseHotword, run a simple classifier.

This specification also presents further information about SparseHotword and DeepHotword with their strengths and weaknesses, and provides results and analysis with real data for use cases.

The following subsections describe in greater depth these two approaches taken towards robust and efficient keyword recognition.

SparseHotword

Sparse coding is a popular method based on unsupervised learning of feature representation that has become very popular in the computer vision and machine learning community. It can be formulated as an optimization method, where, given an input signal x, the goal is to find a code c that depends on a learned dictionary D as follows in Equation (1):

$$\{c, D\} = \underset{\{c, D\}}{\operatorname{argmin}} \|x - Dc\|_2^2 + \|c\|_1 \quad (1)$$

Sparse coding uses the approach of trying to find a dictionary and code so that the reconstruction in L2 sense will be as close to the original as possible, from the first term, while keeping the code as sparse as possible, from the second term.

Some approaches have addressed how to solve this minimization problem that is convex in both c and D, but not jointly. However, another approach that is much simpler was empirically shown to perform well on a computer vision object detection task, as well as in phone classification. This approach consisted of constructing D by either running k-means, or by randomly sampling x and use samples as dictionary atoms.

After finding D, c is formed by a simple matrix-vector product followed by a non-linearity that induces sparsity:

$$c = \max(0, Dx - \alpha) \quad (2)$$

In Equation (2), a is a hyperparameter that is found via cross-validation.

Such an approach performs as well as the original sparse coding approach because coding as in Equation (2) is equivalent to taking one step into the gradient direction of Equation (1).

One of the main advantages of sparse coding is that it does not require lots of data to perform well, and that the dictionary is formed from data in a completely unsupervised way, in that more training data is not required. After finding the code c for each training example x, embodiments proceed in the usual way, which is to pool codes together for each instance, for example image or utterance, and to learn a linear classifier in the pooled code space from training data, typically using a linear SVM.

In a use case, x is a spectro-temporal signal that comes from 40 mel filter banks, looking at 25 ms. of analysis, and shifting the analysis window by 10 ms. at a time. In particular, embodiments obtain a 2D signal of 40N where N is the number of frames that embodiments stack together. Embodiments stack this 2D signal in the vector x of 40N dimensions and code it using Equation (2) to obtain a C dimensional vector. Experiments tried C from 500 to 2000.

Following the coding of $x_t$ at each time step t in an utterance, embodiments operate in either offline or online mode. In offline mode, embodiments take each code $c_t$ and pool all the codes together at the end of the detected utterance. Thus, for each utterance u embodiments obtain a single pooled vector:

$$c_{pooled} = \text{pool\_offline}(c_1, \ldots, c_T) \quad (3)$$

In Equation (3), pooling can be average, max (component-wise), or root mean square, using L2 pooling, and T is the total utterance duration. Note that the resulting vector $c_{pooled}$ is of the same dimension than the original code space, i.e. C, and that, regardless of utterance duration T, the pooling vector does not change. These vectors are then fed to a linear support vector machine (SVM) for classification.

In online mode, which is relevant to a real time scenario such as keyword detection using a mobile device, embodiments take a pooling window of size $N_p$, and perform the pooling operation just on that window. Thus, $$c_{pooled,t} = \text{pool\_online}(c_{t-N_p}, \ldots, c_t) \quad (4)$$

Figure 8:
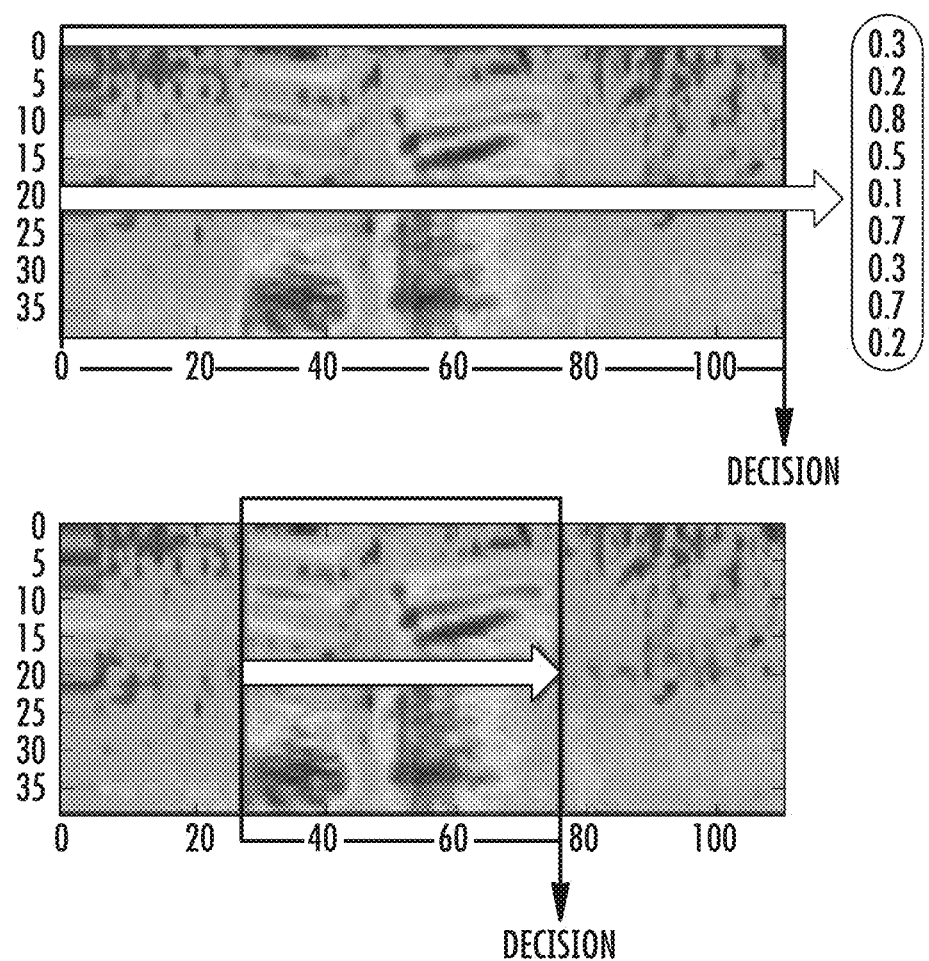
FIG. 8 is a diagram of an utterance in SparseHotword in offline and online mode.

In Equation (4), embodiments obtain a pooled code for each time step t, and at test time embodiments feed that to the classifier so embodiments can decide if a keyword is present or not in an online fashion. During training, only a single pooled window is considered in the following way: for negative utterances, a window is randomly chosen, and for positive utterances, embodiments take the temporal position at the end of the target word, and the previous Np codes and pool them together. FIG. 8 is a diagram of an utterance in Sparse-Hotword in offline and online mode. FIG. 8 shows the offline, at top, and online, at bottom, operations of pooling on the same utterance. The arrow represents pooling. In offline mode, a feature is extracted per utterance, while in online mode, a feature is extracted per time step.

DeepHotword

One of the advantages of SparseHotword is that it requires no additional training data as it learns how to code an utterance with no supervision. However, if embodiments have access to a language with lots of resources, it is desirable to use the resources in an efficient way. Most keyword detection systems start with decoding the utterance which implicitly is using these extra resources: both acoustic and language models are typically trained with lots of data. Once decoded, the lattice generated can be used to extract useful features in a discriminative way.

One aspect of such a method is that decoding generally involves many components which are usually tuned for word error rate, not necessarily to detect a particular word. Furthermore, there is some computational overhead to decode which in some applications such as activation through voice may be critical. To address these aspects of SparseHotword, Deep-Hotword is a proposed approach that uses acoustic models trained with a large corpus, which does not necessarily need to overlap with the corpus used to train the keyword detector. Such an approach avoids performing a full decoding pass.

To this effect, DeepHotword has a large deep neural network trained on billions of frames of English data. In one example embodiment of DeepHotword, the input consists of 26 frames, such that N=26, and the network has 3 hidden layers of 2000 units each. The output layer has 8000 HMM clustered states. Let h{i} be the activations, after the non-linearity at the i-th layer. DeepHotword will use this as the code, and DeepHotword will pool them in the same way that SparseHotword did with sparse codes. Equations (5) and (6) specify how the pooling in DeepHotword works.

$$c_{pooled} = \text{pool\_offline}(h\{i\}_j, \ldots, h\{i\}_T) \quad (5),$$

$$c_{pooled,t} = \text{pool\_online}(h\{i\}_{i-N_p}, \ldots, h\{i\}_i) \quad (6)$$

DeepHotword does not use the output as features as they lie in a high dimensional space (which is more prone to overfitting), and because HMM clustered states are not what Deep-Hotword focuses on. However, both tasks are related, and using the representations learned to achieve phone classification is an obvious way to use learning results to aid in keyword detection. To this effect, it may be noted that deeper layers yield better performance, which will be more extensively discussed in the next section. A possible explanation would be the fact that the hidden units closer to the output make phone states more linearly separable, and embodiments' approaches use a linear SVM, which is very fast to train and test, on the code space.

Experiments/Use

This section details experiments that tested implementations of the SparseHotword and DeepHotword systems. Although there are several differences between the two in terms of how each of them trains the representation that is input to a linear classifier, both of them used exactly the same data to train such classifier. The training set consisted of 10000 utterances that contain the target word—"Google"— in isolation, and 20000 utterances that do not contain it. Each utterance is obtained from the voice search feature available from Android phones, so there is a large variety of channel, noise and speaker conditions. The typical length of "Google" was roughly 600 ms, and the typical negative examples were longer, for example a few seconds.

Embodiments preprocessed each utterance by removing silence surrounding the speech. Next, embodiments extracted 40 dimensional acoustic features by taking the logarithm of 40 mel frequency filter banks response on the amplitude of the short term Fourier transform of the acoustic signal, with a step size of 10 ms and a window analysis of 30 ms. These features are commonly used as the input of acoustic models for Automatic Speech Recognition (ASR). For example, the features are used frequently with a truncated Discrete Cosine Transform (DCT) transform to extract Mel-frequency Cepstral Coefficients (MFCC).

Both systems use the same acoustic features, but Sparse-Hotword uses sparse coding to find a suitable dictionary and coding function to represent the features in a soft and sparse vector quantized space, while DeepHotword uses the activations of a pretrained deep neural network on a much larger corpus of billions of frames, trained to perform HMM state recognition.

Hyperparameter Tuning

There are a number of parameters to be tuned when embodiments operate, such as the context window, for example the stacking of several 40 dimensional acoustic features over time, the coding technique and dictionary type and size in SparseHotword, the layer used to extract the features that will be input to the pooling step in DeepHotword, the pooling window size and method, and the regularization parameter of the linear SVM. All these parameters were optimized using a grid search and a large computer cluster.

For the DeepHotword system, the context size is predetermined by the architecture of the pretrained neural network. In one experimental case, embodiments used a small network with 11 frames as input, and a bigger network with 26 frames. Both these networks had weights pretrained on a large corpus, but these weights were not further tuned to avoid overfitting. Embodiments further extracted feature from the hidden activations of the network. The best hidden layer to extract these activations turned out to be the one right before the output layer, presumably due to the fact that it is the layer which clusters phonetic units in a linearly separable way, as it is the input to the softmax layer.

The SparseHotword system had more parameters to tune. It was determined that a context of 30 or 40 frames as the input to the encoder was better than smaller contexts of 10 or 20 frames, and the learning of the dictionary did not seem very critical, as randomly sampling from the training data yielded similar results than Orthogonal Matching Pursuit (OMP), a variant of k-means. The dictionary size is another important characteristic: if set too big, it may cause overfitting, but if set too low, the local representation may not capture all the non-linearities needed to perform keyword detection. In general, as observed in computer vision, increasing the size does seem to always help due to the very well regularized classifier that was trained after extracting the codes—a linear SVM. However, gains diminish when increasing the codebook size at the expense of computation, and it was found that 2000 was a good tradeoff between the two. Tests also included experimentation with data normalization before coding, and it was observed that ZCA, a form of whitening, did not help, but contrast normalization, including removing mean and dividing by the standard deviation for each frame, consistently helped.

Lastly, the pooling, common to both systems, had two important parameters: the pooling window size, and the pooling method. For offline mode, tests showed that pooling together the whole utterance was best. However, when using a fixed window to operate in online mode, the best results were obtained with window sizes from 60 to 90 frames, slightly longer than the word that embodiments were detecting. Consistent with findings in the literature, the best pooling method for sparse coding was max pooling, that is, taking the max component wise, while RMS or L2 pooling was found to be the best to pool together neural network activations.

Results

The main results are shown in Table 1. The miss rates are reported on a held out set of 200 positive utterances and 1000 negative utterances, and the miss rate is computed at 1% false alarm level per utterance, not per frame, so the offline and online figures mean the same, even though in online mode a potentially wrong decision can be made at each time step, which makes the whole utterance wrong. The baseline system that was used was based on decoding of the utterance, followed by feature extraction, mostly from the decoded lattices, but also including other information such as posteriorgrams, and a logistic regression classifier.

TABLE 1

| System | Offline Miss | Online Miss |
| --- | --- | --- |
| Random | 99% | 99% |
| Baseline | N/A | 10% |
| SparseHotword | 2.3% | 9.8% |
| DeepHotword (small) | 3.3% | 6.1% |
| DeepHotword (big) | 0.5% | 0.9% |

TABLE 1 summarizes the main results. Miss rates are reported at a fixed false alarm level, 1% for various systems and operating modes, offline and online.

Figure 9:
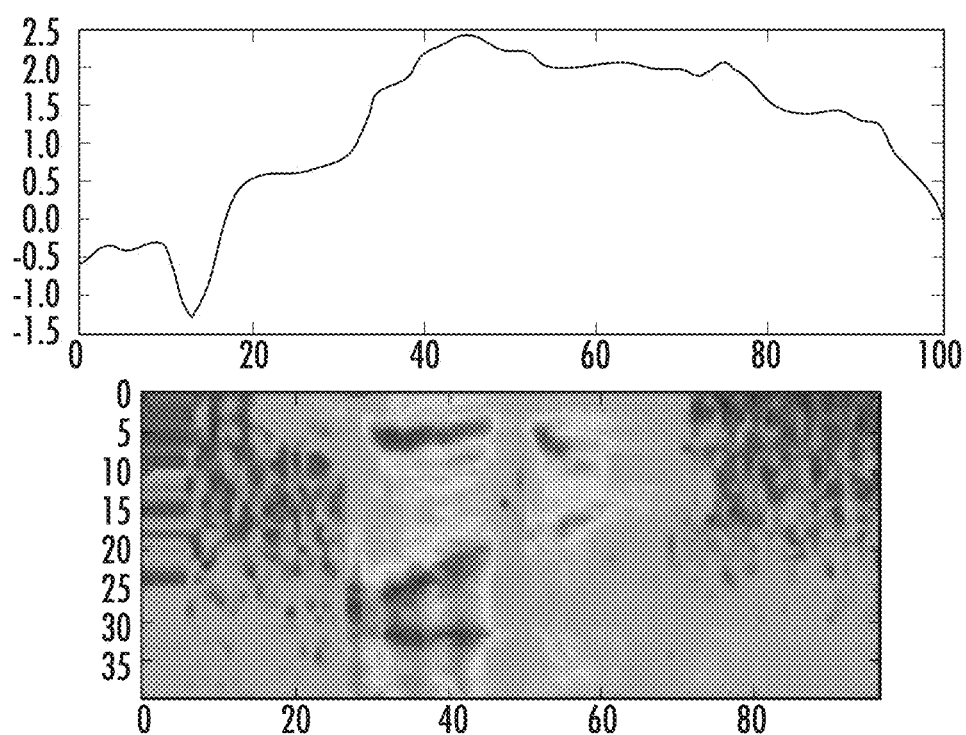
FIG. 9 is a diagram of a positive utterance in the test set, and the online score produced by one of the proposed keyword recognition embodiments.

Furthermore, more results are presented as FIG. 9. FIG. 9 depicts a positive utterance in the test set, and the online score produced by one of the proposed systems in this paper. FIG. 9 shows an utterance where "Google" is present, with the corresponding score. Manual inspection of some of the misclassified utterance revealed that some of them may be human transcription errors. For example, "eagle" instead of "Google" may be a false negative, or "Google maps . . . " may be a false positive.

CONCLUSION

This application begins by presenting embodiments, which include approaches to recognizing when a mobile device should activate or take other actions in response to receiving a keyword as a voice input. Two related approaches to this task, SparseHotword and DeepHotword, are also presented in greater detail.

The application describes how these approaches operate and shows the advantageous results provided by the approaches during experimental usage. These approaches provide the potential to obtain good results while using resources efficiently.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A computer-implemented method comprising:
receiving, by a key phrase detection system that is trained to detect a presence of an utterance of a particular key phrase in an audio waveform, a plurality of audio frame vectors that each model an audio waveform during a different period of time;
generating, by the key phrase detection system, two or more acoustic event vectors by coding respective ones of two or more audio frame vectors from the plurality of audio frame vectors without decoding using a language model, each of the two or more acoustic event vectors having a predetermined length;
generating, by the key phrase detection system, a pooled event vector by pooling all of the two or more acoustic event vectors, the pooled event vector having the predetermined length;
determining, by the key phrase detection system, whether the particular key phrase was present in the audio waveform during the period of time modeled by the audio frame vectors; and
outputting, by the key phrase detection system, a score that indicates a likelihood of whether or not the particular key phrase was present in the audio waveform during the period of time modeled by the audio frame vectors in response to determining whether the particular key phrase was present in the audio waveform during the period of time modeled by the audio frame vectors.

2. The method of claim 1, further comprising:
producing, by the key phrase detection system, the plurality of audio frame vectors that each model the audio waveform during a different period of time by performing front-end feature extraction on an acoustic signal.

3. The method of claim 1, wherein generating, by the key phrase detection system, the two or more acoustic event vectors by coding respective ones of the two or more audio frame vectors without decoding using a language model comprises generating, by a neural network, the two or more acoustic event vectors by coding respective ones of the two or more audio frame vectors.

4. The method of claim 1, wherein generating, by the key phrase detection system, the two or more acoustic event vectors by coding respective ones of the two or more audio frame vectors without decoding using a language model comprises generating, by a restricted Boltzmann machine, the two or more acoustic event vectors by coding respective ones of the two or more audio frame vectors.

5. The method of claim 1, wherein generating, by the key phrase detection system, the two or more acoustic event vectors by coding respective ones of the two or more audio frame vectors without decoding using a language model comprises generating, by a vector quantization dictionary, the two or more acoustic event vectors by coding respective ones of the two or more audio frame vectors.

6. The method of claim 1, wherein generating, by the key phrase detection system, the pooled event vector by pooling all of the two or more acoustic event vectors, the pooled event vector having the predetermined length comprises generating the pooled event vector by pooling all of the two or more acoustic event vectors using root mean square (RMS) pooling, max-pooling, mean-pooling, or a recurrent neural network.

7. A key phrase detection system that is trained to detect a presence of an utterance of a particular key phrase in an audio waveform comprising:
one or more computers and one or more storage devices storing instructions that are operable, when executed by the one or more computers, to cause the one or more computers to perform operations comprising:

receiving, by the key phrase detection system, a plurality of audio frame vectors that each model an audio waveform during a different period of time;

generating, by the key phrase detection system, two or more acoustic event vectors by coding respective ones of two or more audio frame vectors from the plurality of audio frame vectors without decoding using a language model, each of the two or more acoustic event vectors having a predetermined length;

generating, by the key phrase detection system, a pooled event vector by pooling all of the two or more acoustic event vectors, the pooled event vector having the predetermined length;

determining, by the key phrase detection system, whether the particular key phrase was present in the audio waveform during the period of time modeled by the audio frame vectors; and outputting, by the key phrase detection system, a score that indicates a likelihood of whether or not the particular key phrase was present in the audio waveform during the period of time modeled by the audio frame vectors in response to determining whether the particular key phrase was present in the audio waveform during the period of time modeled by the audio frame vectors.

8. The system of claim 7, the operations further comprising:
producing, by the key phrase detection system, the plurality of audio frame vectors that each model the audio waveform during a different period of time by performing front-end feature extraction on an acoustic signal.

9. The system of claim 7, wherein generating, by the key phrase detection system, the two or more acoustic event vectors by coding respective ones of the two or more audio frame vectors without decoding using a language model comprises generating, by a neural network, the two or more acoustic event vectors by coding respective ones of the two or more audio frame vectors.

10. The system of claim 7, wherein generating, by the key phrase detection system, the two or more acoustic event vectors by coding respective ones of the two or more audio frame vectors without decoding using a language model comprises generating, by a restricted Boltzmann machine, the two or more acoustic event vectors by coding respective ones of the two or more audio frame vectors.

11. The system of claim 7, wherein generating, by the key phrase detection system, the two or more acoustic event vectors by coding respective ones of the two or more audio frame vectors without decoding using a language model comprises generating, by a vector quantization dictionary, the two or more acoustic event vectors by coding respective ones of the two or more audio frame vectors.

12. The system of claim 7, wherein generating, by the key phrase detection system, the pooled event vector by pooling all of the two or more acoustic event vectors, the pooled event vector having the predetermined length comprises generating the pooled event vector by pooling all of the two or more acoustic event vectors using root mean square (RMS) pooling, max-pooling, mean-pooling, or a recurrent neural network.

13. A non-transitory computer-readable medium storing software comprising instructions executable by one or more computers which, upon such execution, cause the one or more computers to perform operations comprising:
receiving, by a key phrase detection system that is trained to detect a presence of an utterance of a particular key phrase in an audio waveform, a plurality of audio frame vectors that each model an audio waveform during a different period of time;

generating, by the key phrase detection system, two or more acoustic event vectors by coding respective ones of two or more audio frame vectors from the plurality of audio frame vectors without decoding using a language model, each of the two or more acoustic event vectors having a predetermined length;

generating, by the key phrase detection system, a pooled event vector by pooling all of the two or more acoustic event vectors, the pooled event vector having the predetermined length;

determining, by the key phrase detection system, whether the particular key phrase was present in the audio waveform during the period of time modeled by the audio frame vectors; and outputting, by the key phrase detection system, a score that indicates a likelihood of whether or not the particular key phrase was present in the audio waveform during the period of time modeled by the audio frame vectors in response to determining whether the particular key phrase was present in the audio waveform during the period of time modeled by the audio frame vectors.

14. The medium of claim 13, the operations further comprising:
producing, by the key phrase detection system, the plurality of audio frame vectors that each model the audio waveform during a different period of time by performing front-end feature extraction on an acoustic signal.

15. The medium of claim 13, wherein generating, by the key phrase detection system, the two or more acoustic event vectors by coding respective ones of the two or more audio frame vectors without decoding using a language model comprises generating, by a neural network, the two or more acoustic event vectors by coding respective ones of the two or more audio frame vectors.

16. The medium of claim 13, wherein generating, by the key phrase detection system, the two or more acoustic event vectors by coding respective ones of the two or more audio frame vectors without decoding using a language model comprises generating, by a restricted Boltzmann machine, the two or more acoustic event vectors by coding respective ones of the two or more audio frame vectors.

17. The medium of claim 13, wherein generating, by the key phrase detection system, the two or more acoustic event vectors by coding respective ones of the two or more audio frame vectors without decoding using a language model comprises generating, by a vector quantization dictionary, the two or more acoustic event vectors by coding respective ones of the two or more audio frame vectors.

18. The medium of claim 13, wherein generating, by the key phrase detection system, the pooled event vector by pooling all of the two or more acoustic event vectors, the pooled event vector having the predetermined length comprises generating the pooled event vector by pooling all of the two or more acoustic event vectors using root mean square (RMS) pooling, max-pooling, mean-pooling, or a recurrent neural network.

19. The method of claim 1, wherein outputting, by the key phrase detection system, the score that indicates a likelihood of whether or not the particular key phrase was present in the audio waveform during the period of time modeled by the audio frame vectors in response to determining whether the particular key phrase was present in the audio waveform during the period of time modeled by the audio frame vectors comprises outputting, by the key phrase detection system, a binary score that indicates whether or not the particular key phrase was present in the audio waveform during the period of time modeled by the audio frame vectors.

20. The system of claim 7, wherein outputting, by the key phrase detection system, the score that indicates a likelihood of whether or not the particular key phrase was present in the audio waveform during the period of time modeled by the audio frame vectors in response to determining whether the particular key phrase was present in the audio waveform during the period of time modeled by the audio frame vectors comprises outputting, by the key phrase detection system, a binary score that indicates whether or not the particular key phrase was present in the audio waveform during the period of time modeled by the audio frame vectors.

21. The medium of claim 13, wherein outputting, by the key phrase detection system, the score that indicates a likelihood of whether or not the particular key phrase was present in the audio waveform during the period of time modeled by the audio frame vectors in response to determining whether the particular key phrase was present in the audio waveform during the period of time modeled by the audio frame vectors comprises outputting, by the key phrase detection system, a binary score that indicates whether or not the particular key phrase was present in the audio waveform during the period of time modeled by the audio frame vectors.

* * * * *